May 26, 1931. G. C. BEIDLER 1,807,274
FILM STRAIGHTENING DEVICE
Filed Aug. 9, 1927
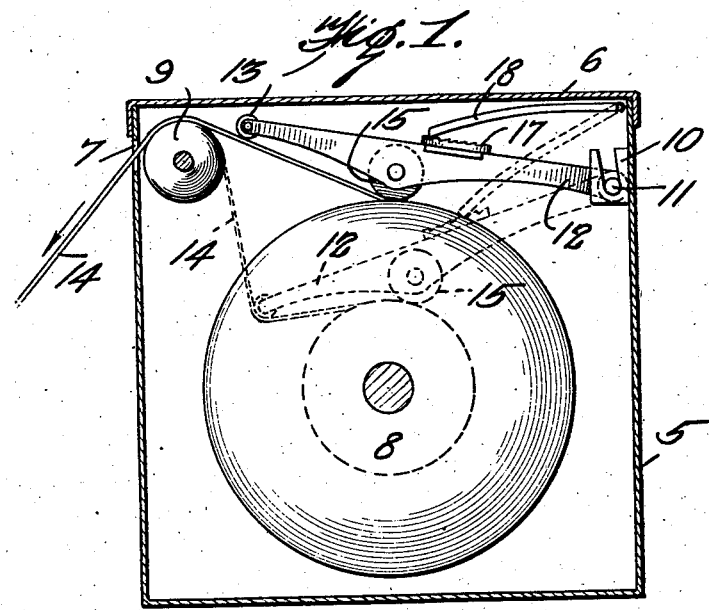
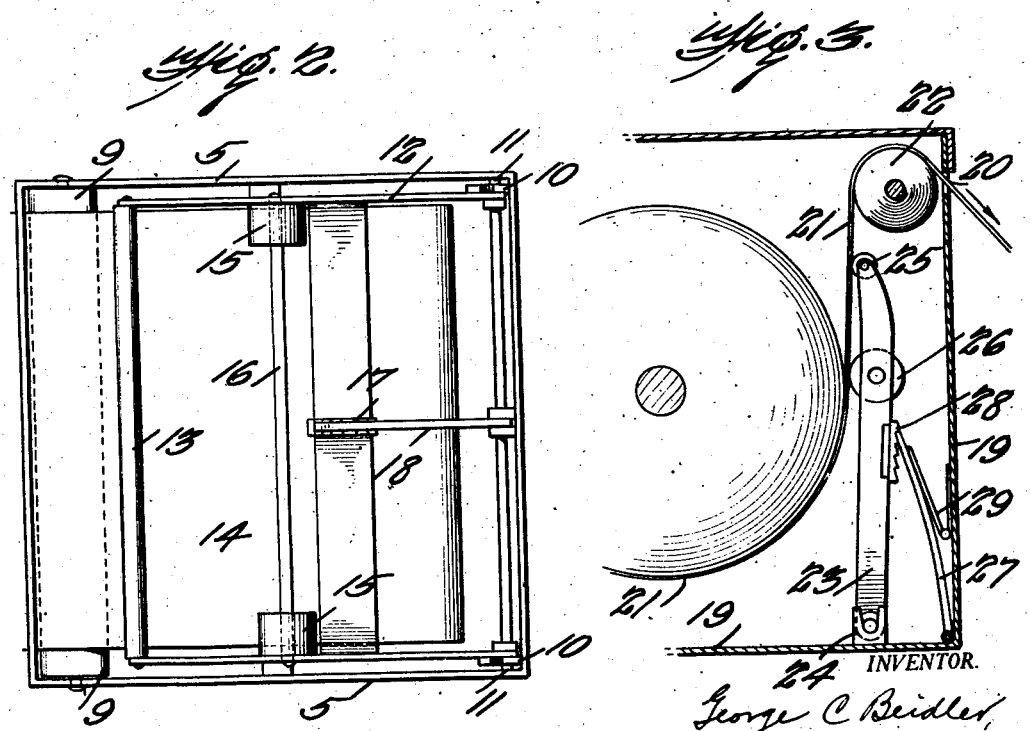

Patented May 26, 1931

1,807,274

UNITED STATES PATENT OFFICE

GEORGE C. BEIDLER, OF ROCHESTER, NEW YORK

FILM STRAIGHTENING DEVICE

Application filed August 9, 1927. Serial No. 211,792.

This invention relates to containers for photographic film that is wound on a spool, and the invention has for an object the provision of novel means for removing or modifying the curl of the film as it is being unwound and transferred to an exposing chamber of a camera.

The usual photographic paper film is, of course, coated with an emulsion and, when wound on a spool, the film curls as it is drawn from the roll. The film on the core or near the center of the roll has a more abrupt bend or curl than that near the periphery of the roll, and it is an object of this invention to remove or modify the curl, as stated.

It is furthermore an object to exert a tension on the film, which tension increases approximately proportional to the curling action of the film, as it is taken from the roll near the core. In other words, the film tensioning device progressively increases its tensioning action as the film on the roll diminishes, and insures the delivery of the film to the exposing chamber in a relatively straight condition.

It is a still further object of this invention to produce a device which will act on film when wound on a spool with the emulsion on the inner face of the film, or in association with film in which the coating is on the outer surface of the film.

It is furthermore an object of this invention to produce a device of the character indicated which will operate automatically and position itself in operative relation to the roll of film.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a vertical sectional view of a box with a tensioning device embodying the invention applied thereto;

Figure 2 illustrates a plan view thereof with the cover removed; and

Figure 3 illustrates a sectional view of a tensioning device employed in association with a roll of film whose emulsion side is wound next to the core.

In the present embodiment of the invention, the film box 5 has a removable cover 6 and a slot 7 in one of its sides through which the film is drawn from the spool 8 that is rotatably mounted in the box.

A guide roller 9 is journaled in the box with its periphery preferably above the line of the slot 7 in order that the film in traveling from the box through the slot will ride over the roller 9. Brackets 10 are secured to the inner surface of the box, and trunnions 11 of an oscillatable frame 12 partially rotate in the said brackets or bearings.

A roller 13 is rotatably mounted with relation to the frame and it is intended to ride on the film 14 as it is unwound from the spool and moving toward the roller 9. The length of the frame is such that the roller 13 flexes the film at locations between the roller 9 and the core of the spool, and as the frame moves inwardly with relation to the core, the friction between the film and the roller of the frame is increased and, hence, the flexing action and the efficiency occasioned by the action is augmented as the film on the spool diminishes.

The frame is supported on the wound film through the employment of rollers 15 which are rotatable on a shaft 16 of the frame and, by this means, the frame will be caused to move from its full line position in Fig. 1 to the dotted line position thereof and it will continue to move inwardly toward the core of the spool as the film is unwound. As the curl of the paper increases toward the core, the tension of the roller 13 will increase and this action will tend to remove the curl from the film.

A ratchet 17 is carried by the frame and the said ratchet is engaged by a dog 18 which will be effective to offer resistance to the force of the film as it is being drawn from the core or roll of film.

In Fig. 3, as has been stated, the invention is applied to a box containing a spool on which the film has its sensitized surface wound on the inside and, in this embodiment of the invention, the box 19 has a slot 20 through which the film 21 emerges from the box over a guiding roller 22. The frame 23 is oscillatably mounted in bearings 24, similar to those heretofore described, and the frame is of substantially the same construction as the frame 12, except that it is positioned to oscillate on a plane at right angles to that in which the frame 12 oscillates. The frame has a friction roller 25 and rollers 26 which engage the wound film. A dog 27 is pivotally mounted to operate in association with the ratchet 28, and a spring 29, bearing against the inner surface of the box and engaging the dog, tends to force the frame 23 toward the core and maintains the parts in operative positions.

I claim:

1. A box, a rotatively supported roll of film in the box, bearings in the box at one side of the axis of the roll, a frame having trunnions mounted in the bearings, a roller journaled in the frame between its ends adapted to ride on the surface of film on the roll, a roller at the end of the frame adapted to engage film unwound from the roll and operative to remove excessive curl from the film, and means for forcing the first mentioned roller into engagement with the film.

2. A box for rotatively supporting a roll of film, bearings in the box at one side of the axis of the roll, a frame having trunnions mounted in the bearings, a roller journaled in the frame between its ends adapted to ride on the surface of film on the roller, a roller at the end of the frame adapted to engage film unwound from the roll and operative to remove excessive curl from the film, means for forcing the first mentioned roller into engagement with the film on the roll, a ratchet on the said frame, and a detent interposed between a part of the box and the said ratchet and engaging the ratchet for holding the frame against retrograde movement.

GEORGE C. BEIDLER.